(12) United States Patent
Purdy

(10) Patent No.: US 6,593,722 B2
(45) Date of Patent: Jul. 15, 2003

(54) CHARGING SYSTEM FOR BATTERY-POWERED DRIVE SYSTEM

(76) Inventor: Geoffrey William Purdy, 85A Market Street, Mottram Hyde SK14 6JQ (GB)

( * ) Notice: Subject to any disclaimer, the term of this patent is extended or adjusted under 35 U.S.C. 154(b) by 0 days.

(21) Appl. No.: 10/075,107

(22) Filed: Feb. 13, 2002

(65) Prior Publication Data

US 2002/0113577 A1 Aug. 22, 2002

Related U.S. Application Data

(60) Provisional application No. 60/270,049, filed on Feb. 20, 2001.

(51) Int. Cl.[7] .................................................. H02J 7/00
(52) U.S. Cl. ...................................................... 320/104
(58) Field of Search ................................ 320/103, 104, 320/127, 128, 137

(56) References Cited

U.S. PATENT DOCUMENTS 5,610,502 A * 3/1997 Tallant, II et al.
5,982,156 A * 11/1999 Weimer et al.
6,198,257 B1 * 3/2001 Belehradek et al.

* cited by examiner

Primary Examiner—Edward H. Tso
(74) Attorney, Agent, or Firm—Myers Bigel Sibley & Sajovec

(57) ABSTRACT

A drive system for a battery-powered vehicle comprising an AC or DC motor comprises a rechargeable battery, a voltage boost circuit for enabling the motor to be provided with power at a voltage greater than that of the battery and for enabling the speed of the motor to be controlled, said boost circuit comprising contactors simultaneously movable to lie either at a first position when the battery is discharging to the motor, or at a second position when the battery is being recharged.

14 Claims, 3 Drawing Sheets

CHARGING SYSTEM FOR BATTERY-POWERED DRIVE SYSTEM

RELATED APPLICATION

This utility application claims the benefit of U.S. Provisional Application No. 60/270,049, filed Feb. 20, 2001, the disclosure of which is hereby incorporated herein by reference.

FIELD OF THE INVENTION

This invention relates to a charging system for a battery-powered drive such as used, for example, for a fork lift truck.

BACKGROUND OF THE INVENTION

One proposal for a system for a battery-powered vehicle has been described and claimed in our pending UK Patent Application No. 9809802.3.

With reference to the circuit shown in FIG. 1, an AC cage type induction motor is shown at 10 and is supplied with power by means of a DC powered drive circuit in the form of a variable frequency inverter 11. The inverter 11 is of any convenient type and can itself be controlled in order to provide for speed and directional control of the motor. The power supply to the inverter is derived from a DC-DC converter which includes a capacitor C which is charged from the vehicle battery by controlling the operation of a solid-state switch QI. The switch, when closed, causes current to flow from the battery into an inductor L and when the switch is opened, the flux collapse in the inductor induces a high voltage which is added to that of the battery to charge the capacitor by way of the diode DI. The diode prevents discharge of the capacitor when the switch is reclosed.

The switch, which in this case is shown as an IGBT, is subject to mark/space ratio control and the voltage Vc at the capacitor terminals is related to the battery voltage Vb by the equation:

$$Vc = Vb \cdot Tp[/Toff$$

where Tp is the sum of the on and off times of the switch and Toff is the off time of the switch.

It will be noted that as Toff tends to zero, Vc tends to infinity. In practice boost ratios of 5–6 to one are attainable.

FIG. 2 shows a modification to the circuit of FIG. 1 in order to pass energy from the capacitor to the battery. This is achieved using the solid-state switch Q2 which is connected in parallel with the diode DI and a further diode D2 is connected in parallel with the switch Q1. By controlling the operation of the switch Q2 energy can be passed to the battery, thus providing regenerative braking of the motor.

FIG. 3 shows a modified circuit which produces an inverted output voltage. A further inductor L2 and a further capacitor C2 are introduced into the circuit. When switch QI is closed the flux builds up in the inductor LI and when the switch is opened capacitor C2 is charged as in the example of FIG. 1. When the switch is reclosed the charge on capacitor C2 is transferred to capacitor CI by way of the second inductor.

The circuit can operate in the reverse direction by operating the switch Q3, for the purpose of transferring energy back to the battery and providing regenerative braking.

In the circuit shown in FIG. 4 an upward voltage conversation is effected in two stages. LI, CI, Q1 and the diode of Q2 form a well-known boost converter circuit. The switching of QI will produce a voltage in excess of that of BTI across CI as a function of the switching mark to space ratio. Whilst it is theoretically possible to utilize this stage to achieve the full step up range (in the case shown 80 to 560 volts) in practice a step up exceeding 5:1 becomes inefficient and a second stage consisting of Q3, Q4, L2 and C2 is provided. Q3 and Q4 are switched on a 50:50 basis with the result that a voltage across C2 is produced equal in magnitude to that across CI, as shown in the diagram. The resulting 560-volt bus feeds the motor drive inverter.

Under energy recovery conditions, the charge on CI is transferred to the battery via L1, Q2 and the diode of Q1 acting in the well known buck converter configuration, where energy from a high voltage source can be transferred to a low-voltage load.

The action of C2, Q3 and 04 corresponds to the above-described actions, ensuring that the potentials across C1 and C2 remain constant and equal.

Using the circuits described it is possible to power volume produced high voltage motor inverter units from the low voltage batteries fitted on battery-powered vehicles, thereby enabling such vehicles as fork lift trucks, to be manufactured more cheaply.

SUMMARY OF THE INVENTION

According to some embodiments of the invention, a drive system for a battery-powered vehicle including an AC or DC motor includes a rechargeable battery and a voltage boost circuit for enabling the motor to be provided with power at a voltage greater than that of the battery and for enabling the speed of the motor to be controlled. The boost circuit includes contactors simultaneously movable to lie either at a first position when the battery is discharging to the motor, or at a second position when the battery is being recharged. The boost circuit further includes an inductor which includes a secondary winding which is used only during recharge of the battery.

According to further embodiments of the invention, a battery-powered vehicle includes an AC or DC motor. The vehicle further includes a drive system include a rechargeable battery and a voltage boost circuit for enabling the motor to be provided with power at a voltage greater than that of the battery and for enabling the speed of the motor to be controlled. The boost circuit includes contactors simultaneously movable to lie either at a first position when the battery is discharging to the motor, or at a second position when the battery is being recharged. The boost circuit also includes an inductor which includes a secondary winding which is useful only during recharge of the battery.

DESCRIPTION OF THE INVENTION

By the present invention it is taught that the voltage boost facility of the aforedescribed type of system can be adapted to permit recharge of the battery. This is achieved by the provision of three contactors in the boost circuit. An example of an embodiment of this aspect of the invention is shown by FIG. 5 wherein the drive system 40 comprises three simultaneously operated contactors 30, 31, 32 are closed when the battery is on discharge, and opened when a three phase supply is connected across the points A and B.

Figure 1:
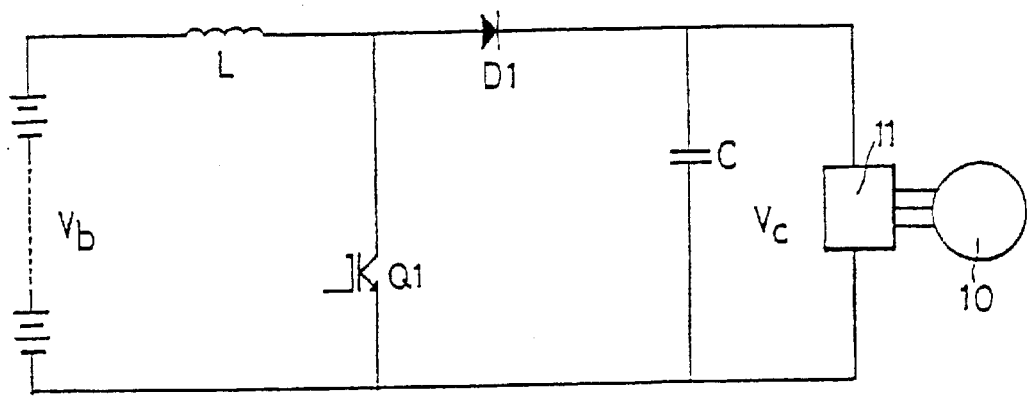
FIGS. 1–4 illustrate conventional drive circuits.
Figure 2:
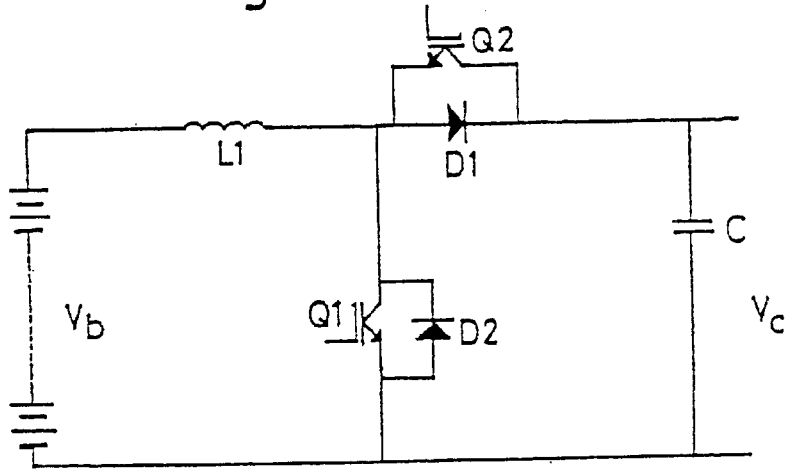
Figure 3:
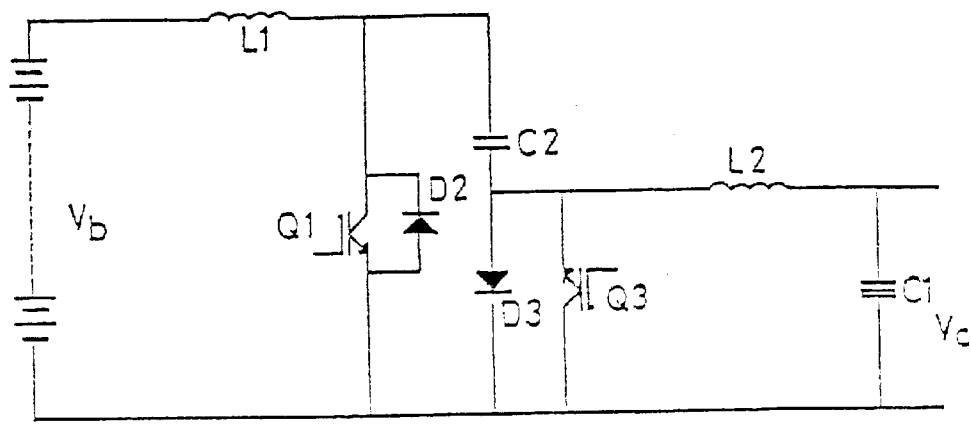
Figure 4:
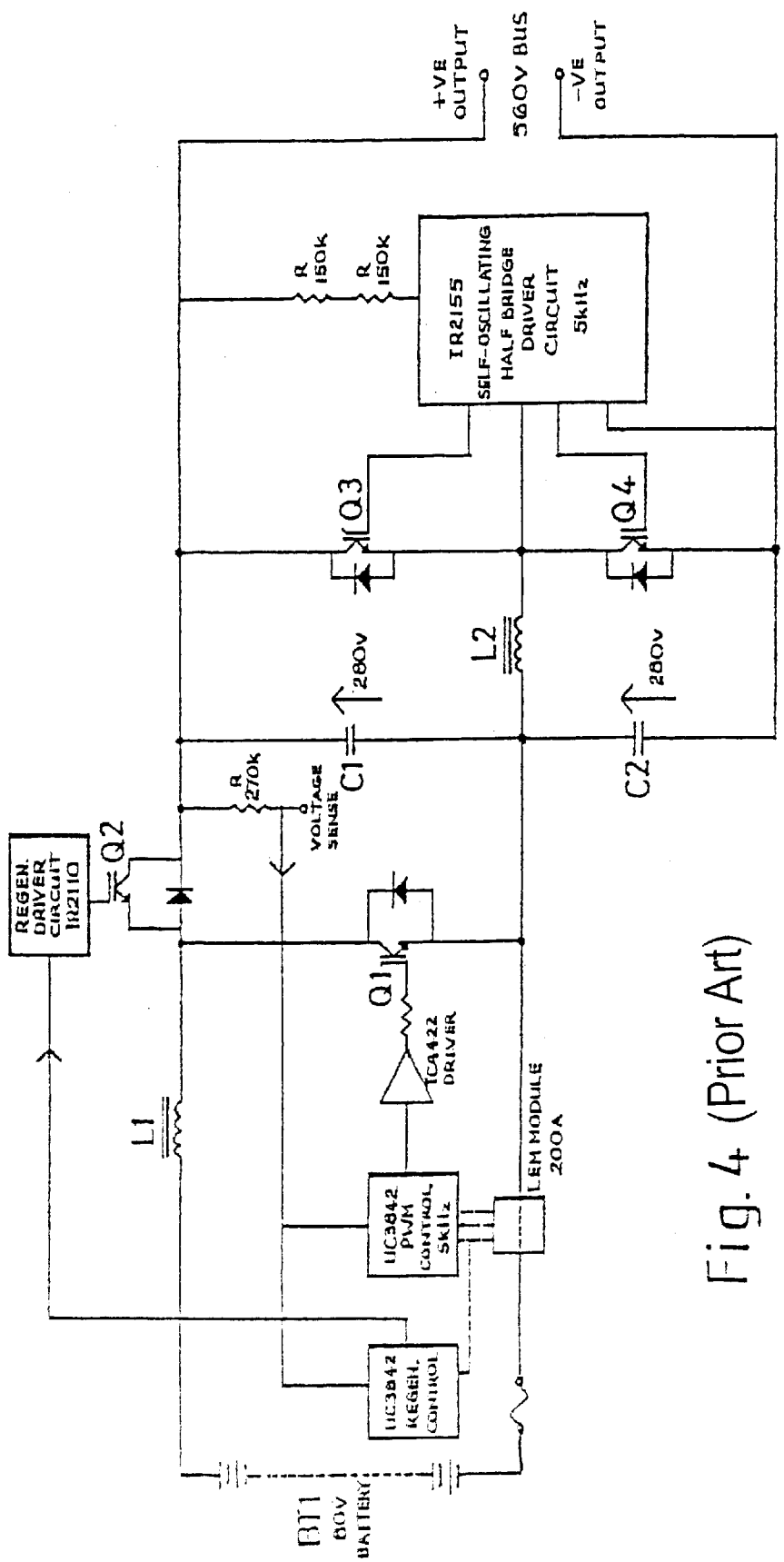
Figure 5:
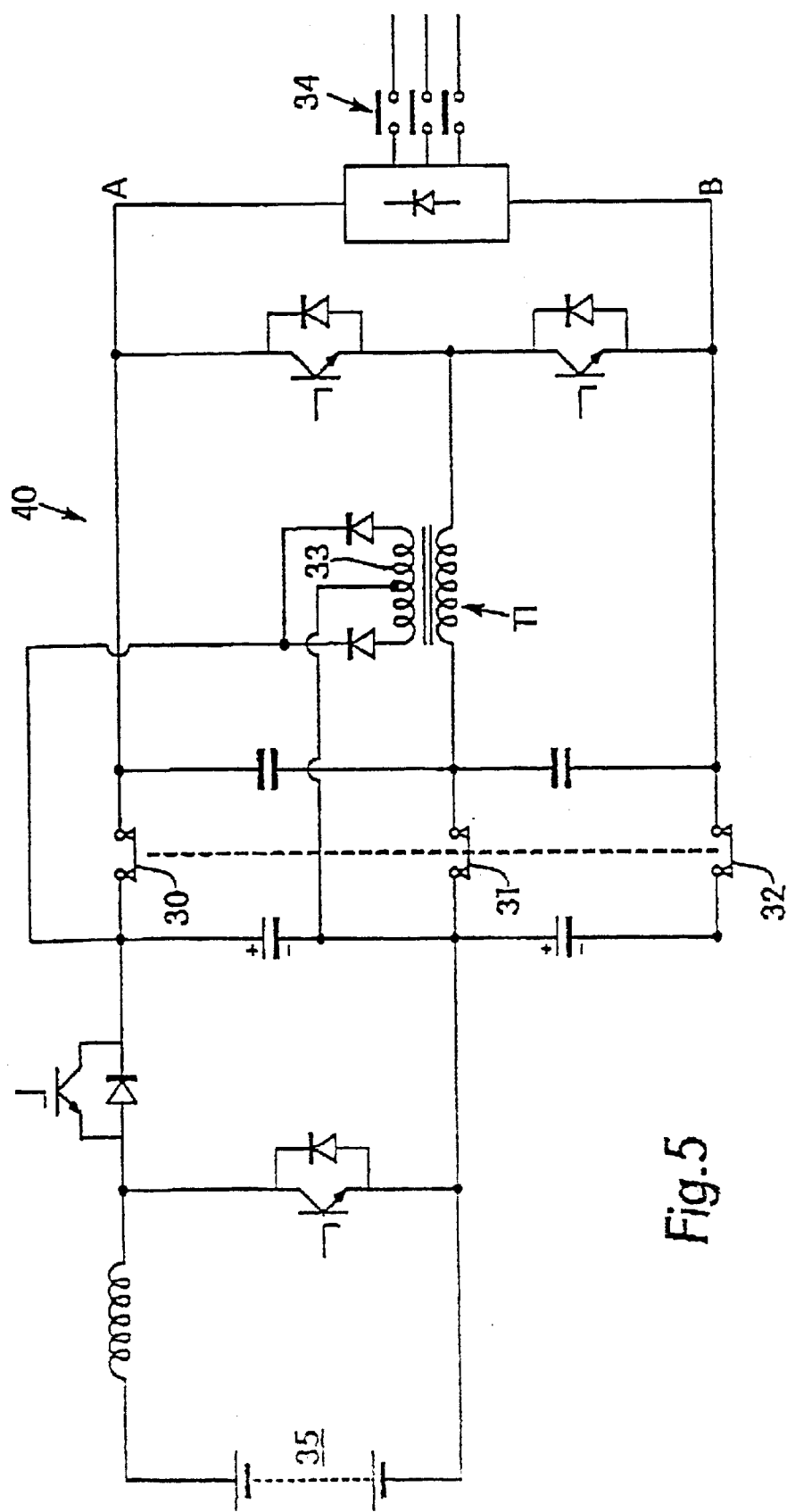
FIG. 5 illustrate a drive system according to some embodiments of the invention.

As further illustrated in FIG. 5, a boost inductor T1 has a second winding 33 in which the discharger is not used.

When the three-phase supply 34 is connected to recharge the T1 battery 35, the contactors 30, 31, 32 open and the secondary 33 of the inductor acts as a secondary of a transformer such that the output is then rectified for charging the battery 35.

In use of the drive systems to which reference has hereinbefore been made, and as applied to the control of a DC type motor, the speed of the motor may be varied in known manner by varying the magnitude of the increase of DC voltage. There thereby results a cost effective means of providing DC motors for small electric vehicles. In particular, by employing a DC boost converter to raise the voltage supply from a battery, it is possible to use conventional higher voltage DC motors that can readily be made at relatively low cost with windings formed on conventional automated equipment.

Typically the boost converter may be employed to vary the speed of the motor by varying the "on" time of the boost circuit. An example is that of an 80-volt battery which can be employed to feed a 500-volt DC motor with a variable voltage ranging between 80 and 500 volts. This enables the motor to start from rest and increase in speed as the vehicle or drive motor accelerates.

In another example, a single stage boost may be employed to operate a 100-volt motor from a 12-cell battery with a 4:1 range to provide speed control. That is, the supply voltage to the motor can range from 24 to 100 volts, this being generally sufficient for the motor to start from rest and slowly speed up to full output.

If a two-stage boost is employed, a voltage range of 80 to 500 volts (e.g., a ratio of 6:1 or 8:1) typically may be achieved and is particularly potentially suitable for the drive system of a road type electric vehicle.

What is claimed is:

1. A drive system for a battery-powered vehicle comprising an AC or DC motor, said system comprising:
   a rechargeable battery; and
   a voltage boost circuit for enabling the motor to be provided with power at a voltage greater than that of the battery and for enabling the speed of the motor to be controlled, said boost circuit comprising contactors simultaneously movable to lie either at a first position when the battery is discharging to the motor, or at a second position when the battery is being recharged, and said boost circuit comprising an inductor which comprises a secondary winding which is used only during recharge of the battery.

2. A drive system according to claim 1 wherein the contactors are movable to said second position for allowing the battery to be recharged from an external power supply.

3. A drive system according to claim 1 wherein said external supply is a three-phase supply.

4. A drive system according to claim 1, wherein movement of the contactors to said second position connects the secondary winding to facilitate rectification of an external AC power supply for charging the battery.

5. A drive system according to claim 2, wherein movement of the contactors to said second position connects the secondary winding to facilitate rectification of an external AC power supply for charging the battery.

6. A drive system according to claim 3, wherein movement of the contactors to said second position connects the secondary winding to facilitate rectification of an external AC power supply for charging the battery.

7. A drive system according to claim 1, wherein the boost converter varies the speed of the motor by varying the on time of the boost circuit.

8. A drive system according to claim 2, wherein the boost converter varies the speed of the motor by varying the on time of the boost circuit.

9. A drive system according to claim 3, wherein the boost converter varies the speed of the motor by varying the on time of the boost circuit.

10. A drive system according to claim 4, wherein the boost converter varies the speed of the motor by varying the on time of the boost circuit.

11. A drive system according to claim 1, comprising a single stage boost circuit.

12. A drive system according to any one of claim 1, comprising a multi stage boost circuit.

13. A battery-powered vehicle comprising:
    an AC or DC motor; and
    a drive system comprising:
      a rechargeable battery; and
      a voltage boost circuit for enabling the motor to be provided with power at a voltage greater than that of the battery and for enabling the speed of the motor to be controlled, said boost circuit comprising contactors simultaneously movable to lie either at a first position when the battery is discharging to the motor, or at a second position when the battery is being recharged, and said boost circuit comprising an inductor which comprises a secondary winding which is used only during recharge of the battery.

14. A battery-powered vehicle according to claim 9 wherein the battery is used to drive the motor for movement of the vehicle over a ground surface and to cause at least upward movement of support means for lifting loads.

* * * * *